D. F. COMSTOCK.
ART OF FORMING, AND TRANSPARENCY FOR PRODUCING, COLORED PROJECTED IMAGES.
APPLICATION FILED OCT. 22, 1915.
1,232,504.
Patented July 10, 1917.
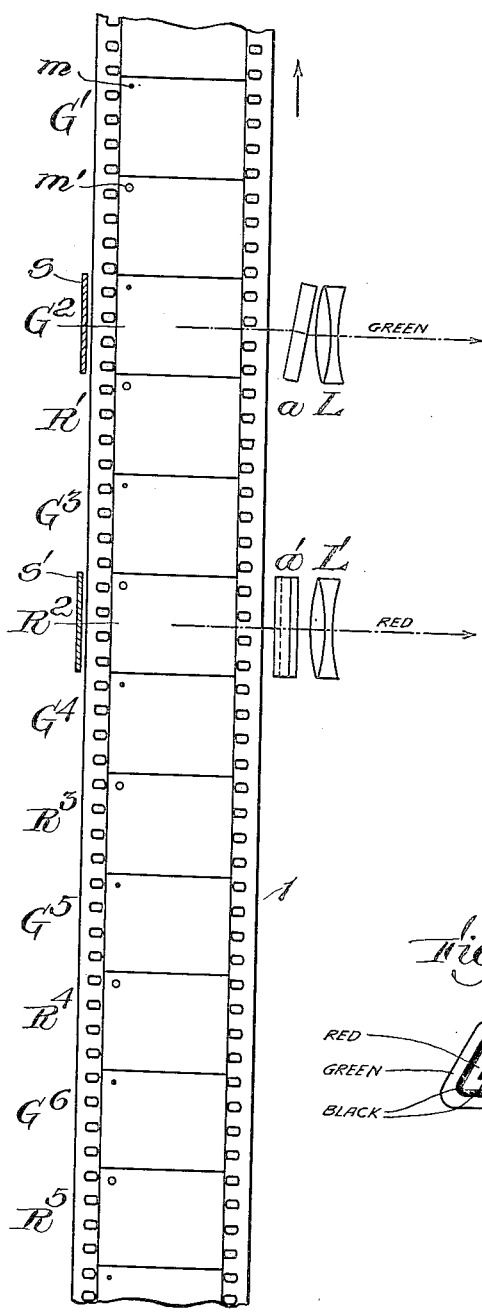
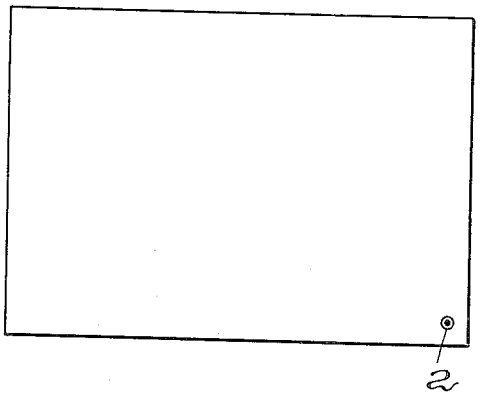
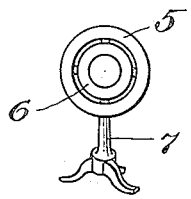
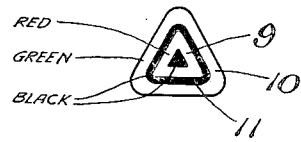
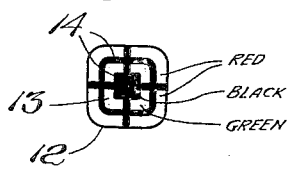
Inventor:
Daniel F. Comstock
by Roberts, Roberts & Cushman
his Attorneys

UNITED STATES PATENT OFFICE.

DANIEL F. COMSTOCK, OF BROOKLINE, MASSACHUSETTS, ASSIGNOR, BY MESNE ASSIGNMENTS, TO TECHNICOLOR MOTION PICTURE CORPORATION, OF BOSTON, MASSACHUSETTS, A CORPORATION OF MAINE.

ART OF FORMING, AND TRANSPARENCY FOR PRODUCING, COLORED PROJECTED IMAGES.

1,232,504.

Specification of Letters Patent.

Patented July 10, 1917.

Application filed October 22, 1915. Serial No. 57,355.

*To all whom it may concern:*

Be it known that I, DANIEL F. COMSTOCK, a citizen of the United States, and resident of Brookline, in the county of Norfolk and State of Massachusetts, have invented new and useful Improvements in Art of Forming, and Transparencies for Producing, Colored Projected Images, of which the following is a specification.

My invention relates to the art of forming projected polychromatic motion pictures composed of two or more component images overlaid, fitted together or registered on the same viewing screen. My invention further relates to a transparency forming the object of the projected image, characterized by indications made a part thereof for the purpose of enabling accurate register of the components of the composite or polychromatic projection image to be found and maintained by the operator during the practice of my said new art.

In certain new inventions of means for and articles for use in taking and projecting automatically-colored motion pictures, forming no part of the present invention, use is made of a film or transparency having thereon simultaneous complemental groups of geometrically like pictures having members taken in light predominantly of a different color for each picture, the members of each group respectively showing the appearance from the same point of view of the same object-field when viewed in light of the respective color, the pictures otherwise being identical.

These groups of pictures are to be viewed as a single colored picture by projection on a distant screen, and because of their qualities above suggested, their projections are adapted to be placed in exact registry one over the other, either simultaneously, or successively within the period of persistence of vision.

It sometimes occurs that the distance between the images of the same point in the complemental groups of pictures is not exactly the same distance at one end of a length of film as at the other end.

It also sometimes occurs that one of the members of the group of pictures is shifted by a small but visible amount, when powerfully magnified, laterally with respect to the longitudinal extent of the film, and in some cases one of the pictures may be incorrectly positioned with respect to another in a direction having as components both lateral and longitudinal errors of position of one of the members of the group with respect to the other or others.

These errors of position are due either to accidental changes affecting the carrier, body or base of the film strip, such as temperature changes or changes due to shrinkage or drying, or to a lack of consc_nce between the constant optical elements of the camera and of the projection lantern. One object of the said inventions was to so arrange the component parts of the groups of pictures as to render errors of this nature constant errors; *i. e.*, to reduce the probability of change between successive complemental pairs of pictures to a minimum. I will now explain an accurate and rapid method of finding and manually maintaining registry during projection.

In the accompanying drawings,

Figure 1 is a diagram face view of a transparency, strip or film provided with certain devices presently to be explained.

Fig. 2 is an explanatory diagram of the coincident or compound image of two or more parts of the film illustrated in Fig. 1.

Fig. 3 is an elevation of a target or fixed object placed in the object-field; and Figs. 4 and 5 illustrate modified forms of such a target.

As shown in Fig. 1, a preferred form of the transparency 1 has upon it simultaneously taken groups of pictures, the members of the group being spaced apart for projection through different lens systems, a group of two complemental pictures $G^2$, $R^2$, for instance, being separated by spaces for the pictures $R'$, $G^3$ of other groups. Any convenient form of projection apparatus may be employed for either successive or simultaneous display of the image of each member of the group at the same position on a distant screen, the different images being resolved either by actual coincidence or by persistence of vision into a compound impression made up of the superposed images. For color projection, one member of a group having been formed to show the intensities of light of one color and another member to show the intensities of another color, each member of the group may be projected in a color the same as or related to that color by or for which it was photographed. Means for this purpose may comprise a source or sources of white light and color absorption screens as $s$, $s'$ so one side of the film, the projection lenses L, L' being on the other side of the film and spaced apart to conform to the position of the members of the group of pictures, as $G^2$, $R^2$.

While I may adjust any part of either the object (the transparency 1) or the optical train in order to bring the respective images into registry and maintain them in registry during the successive display of a number of complemental groups of pictures, I prefer to adjust the pictures manually by altering the virtual position of the optical axes of the lenses L, L', the mechanical relation of the lenses remaining fixed, and for this purpose I may employ means indicated at $a$, $a'$, but forming no part of the present invention, comprising refracting plane parallel plates adapted to be rotated out of normal to the axes of the respective lenses. The extent and direction of the error of position of the images of the respective lenses must be observed by the operator before adjustment, as well as the result of the adjustment while being made.

I have determined by experience that it is difficult for the operator in charge of such a projector, who is also required to attend to focusing, the adjustment of the light, and to changing the pictures at the end of each reel, to make the primary adjustment of the axes of the projection lantern to fit a new section of film, which may vary a little from that preceding it, without a course of trial and error which it is desirable to avoid in the presence of an audience, if reliance to determine the error of registry is upon some part of the picture merely fortuitously chosen when the adjustment is made. Errors that are scarcely visible in pictures of some objects are very plain in pictures of other objects.

The errors of position of the complementary pair usually being constant errors, the operator will not be required to find and correct errors of registry of the superposed image at very frequent intervals, but it is desirable that any error of registry be indicated to him and presented to him in such a manner as to make its correction easy, before it shall be noticed by the audience.

I therefore provide each member of a complementary pair of pictures with a constant mark or indication, as at $m$, $m'$, relating to the color of that picture only, these marks or indications on both pictures being arranged so as to coördinate without overlapping at the viewing screen when the registry is accurate.

One object of this device is to provide in a fixed part of the field to which the attention of the operator may be constantly directed, a sign or mark or indication adapted to display any lack of registry in a definite manner as soon as it occurs, it being obvious that dependence upon the variable parts of a motion picture, to find a place which will display by an edge or fringe of color a growing lack of registry, is out of the question.

As illustrated in Figs. 1 and 2, I may place in the object-field of the pictures taken, during taking, an object or target characterized by a definite pattern which has elements colored with the pure color of the respective taking screens, and which appears in the projected picture, as at 2. One effective emblem of this sort illustrated in Fig. 3, comprises a red annulus 5 having concentric within it a green annulus 6, mounted on any suitable stand or support, such as shown at 7. This object can be placed on the ground or at one side of the stage, or otherwise be mounted in the object-field so as to occupy a position near one corner of the field of the picture. The pattern of the object or target may vary, as illustrated at 9, 10, 11, Fig. 4, and at 12, 13, 14, Figs. 4 and 5, and the elements 6, 10 or 13 may if desired be separated from the complementary elements 5, 9 and 12 by areas 11 or 14 of a black or a very dark surface.

As best illustrated in Fig. 1, the red object, as 5, will appear strongly at $m'$ in the pictures taken in the red light and will appear but faintly or not at all in the pictures taken in the green light. The green object, as 6, will appear strongly at $m$ in the pictures taken in the green light and faintly or not at all in the pictures taken in the red light. I mention red and green as instances only of complementary colors, it being obvious that the target may be colored to respond to any series of colors used in the taking screens of the camera.

A strip such as that shown in Fig. 1 will therefore be characterized by complemental pairs of pictures, one member of each pair of which bears at one place a part $m$ or $m'$ of a multi-color emblem or target, the other member of the pair of pictures bearing the other part of the emblem or target at the same relative place. But in each case, when the pictures are assembled or registered on the screen, the red and the green parts of the target or emblem being of different dimensions, will be distinct, and so coördinated as to make error of position of either element apparent at once.

The use of my device will now be appreciated. The operator at the lantern has before him constantly a target 2 shown on a constant part of the viewing screen which, in the illustrative instances suggested, consists of an outer ring and an inner ring fitting within it, with a space between. When these rings are concentric, the pictures are in registry, and when they depart from concentricity, the pictures are not in registry in a direction and to an extent instantly shown by inspection. It will be understood that the concentric rings mentioned are a figure in which the average person has no difficulty in detecting an error and the direction of the error, and the instruction to the man at the lantern may be to concern himself only with this signal, and to keep one circle within the other by adjusting the projector manually, for instance by means such as referred to above to bring the image of one or the other member, or the images of both members of the complementary pair into registry with each other at the screen.

In order to concentrate the attention of the operator upon the signal for registry and to aid his discovery of minute error of registry, I prefer to provide him with a bright-field fixed telescope, which may be mounted on the projector, having an angle of field large enough to include the target or signal, and through which the concentric circles or other figures of the signal are to be observed as magnified beyond their unaided visual appearance to the audience.

It will be understood without further explanation that an operator with very little skill, whose attention is concentrated on an object such as that described indicating lack of registry, will be able to correct any deviation of the picture of one color with respect to the picture of another color before it is noticed by the audience, and that at the beginning of a strip of new film it is possible to display that part of the picture only bearing these indications for an instant, to set the registry at the beginning of that run of film.

While I have described placing an object in the object-field of the taking camera, I do not limit my invention thereto. It will be obvious, for instance, that the taking camera being provided with absorption screens of different kinds at the places of the complementary pairs of pictures, I may arrange a permanent source of illumination for a localized part of the film at each screen, to be uncovered at each exposure of the object-field, and which will be related to the object-field only by the mechanical relation of the optical axis of the taking lens to the position in the camera of the source of illumination, and the film gate, diaphragm or opening through which light is allowed to fall upon the film. But in each case the image on the picture taken in the light of the given color will be related to the proper position for registry of the whole picture of that color. Adjustment of any of the components determining the position of a picture, made as a positive or other derived copy of the original negative, will have the effect described above of placing the whole picture in registry.

What I claim is:

1. A transparency for color projection bearing a group of complementary pictures of an object-field, each picture of said group having therein an area representing the position of a different part of a target or emblem adapted to be visually assembled when the pictures are projected.

2. A photographic transparency for color projection bearing a group of complementary pictures of the same object-field adapted to be separately projected, each picture of said group having therein an area representing the position of a surface of one color of a target or emblem having surfaces of a plurality of colors.

3. A transparency adapted for the projection in registry, each in light of a different color, of pictures in a group carried thereby, having in each picture of a group a photographic impression of a different part of a target or emblem, said parts being adapted when projected to indicate by their mutual positions registry or lack of registry of the remainder of the projected pictures.

4. A monochromatic transparency having separate photographs thereon showing the relative intensities of light of different colors from the same object-field and adapted for simultaneous projection in different colors to thereby form when in registry a composite impression of the color of the object-field, said transparency having in the photographs for each color the picture of a different part of an emblem or target adapted to indicate by the relative positions of its parts registry or lack of registry of the component parts of the composite projected picture.

5. A monochromatic transparency having thereon a series of groups of pictures each picture of a group showing the photographic aspect in a different color of the same object-field, said transparency having in each picture of a group a relatively strong impression of a different part of the surface of a target or emblem having adjacent surfaces differing in color.

6. A monochromatic transparency having thereon a series of groups of pictures, each group showing the values of simultaneous aspects of the same object-field in light of different colors, each picture of a group bearing one part only of the picture of a polychromatic target or emblem, said parts being adapted to fit together to indicate registry of the component of a group when projected on the same area of a viewing screen.

7. The method of finding or maintaining registry of superposed projected color images comprising projecting on a viewing screen, respectively in light of different colors, a plurality of images of a group of transparencies each showing the values of aspect of an object-field in a different color and each bearing a representation of a different part of an emblem or target, and thereafter adjusting with respect to each other the position on the screen of the parts of the composite image of said emblem or target.

8. The method of forming projected color images giving the visual impression of the color and form of an object-field, comprising projecting on a viewing screen, respectively in light of different colors, a plurality of images of a group of monochromatic transparencies each showing the photographic aspect in a different color of said object-field and an emblem or target therein having surfaces differing in color, and thereafter adjusting with respect to each other the position on the screen of the partial images of said emblem or target, whereby to superpose the respective images in registry.

9. The method of forming projected color images giving the visual impression of the color and form of an object-field having therein an emblem or target having adjacent surfaces differing in color, comprising projecting on a viewing screen, each in light respectively of a related color, a plurality of images of a group of monochromatic transparencies showing the color values of said object-field and emblem or target in the respective color, and thereafter adjusting with respect to each other the position on the screen of the parts of the composite image of said emblem or target.

10. The method of forming projected color images giving the visual impression of the color and form of an object-field comprising projecting on a viewing screen, respectively in light of different colors, a plurality of images of a group of transparencies each showing the color values of an object-field in different colors and each bearing a representation of a different part of an emblem or target of the respective colors, and thereafter adjusting by manipulation of the projecting means with respect to each other the position on the screen of the parts of the composite image of said emblem or target.

11. The art of forming projected color images of an object-field comprising the following steps: first preparing a transparency provided with complemental photographs of said field and of a target having surfaces of different colors, one or more of said photographs being made by light subjected to selective absorption of color, whereby the photographs differ with respect to the representation thereon of said target; then forming images on a screen of said photographs, and then bringing into relation the images of the respective surfaces of the target each forming a part of one component of the projected composite pictures.

12. The art of forming projected color images of an object-field comprising the following steps: first preparing a transparency provided with simultaneous complemental photographs of said field and a target having adjacent surfaces of different colors, one or more of said photographs being made by light subjected to selective absorption of one of the colors of said target; then forming images on a screen of all of the photographs, and then bringing into adjacent relation the images of the respective surfaces of the target forming a part of each projected picture by optical adjustment of the projecting means.

13. The method of maintaining registry on the viewing screen of projected images of different colors during display of successive registering groups for colored motion-pictures comprising observing the representations of a target or signal having parts respectively of the colors of the component colors of the composite projection and forming a part of each picture displayed, and correcting during continued display the position of the respective projected images with respect to deviations indicated by the positions of the differently colored parts of the composite projection of said signal or target.

Signed by me at Boston, Massachusetts, this 19th day of October, 1915.

DANIEL F. COMSTOCK.